United States Patent
Kim

(10) Patent No.: US 9,791,996 B2
(45) Date of Patent: *Oct. 17, 2017

(54) METHOD FOR DISPLAYING BACKGROUND SCREEN IN MOBILE TERMINAL

(71) Applicant: Samsung Electronics Co. Ltd., Suwon-si, Gyeonggi-do (KR)

(72) Inventor: Young-Jun Kim, Pocheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

This patent is subject to a terminal disclaimer.

(21) Appl. No.: 14/056,298

(22) Filed: Oct. 17, 2013

(65) Prior Publication Data

US 2014/0047382 A1    Feb. 13, 2014

Related U.S. Application Data

(63) Continuation of application No. 12/900,715, filed on Oct. 8, 2010, now Pat. No. 8,577,419.

(30) Foreign Application Priority Data

Oct. 13, 2009  (KR) .................. 10-2009-0097255

(51) Int. Cl.
```
G06F 3/048      (2013.01)
G06F 3/0481     (2013.01)
G06F 3/0483     (2013.01)
G06T 11/60      (2006.01)
H04M 1/725      (2006.01)
G06F 3/01       (2006.01)
G06F 3/0484     (2013.01)
G06F 3/0488     (2013.01)
G06F 3/0482     (2013.01)
```

(52) U.S. Cl.
CPC .......... *G06F 3/04817* (2013.01); *G06F 3/016* (2013.01); *G06F 3/0481* (2013.01); *G06F 3/0482* (2013.01); *G06F 3/0483* (2013.01); *G06F 3/0484* (2013.01); *G06F 3/0488* (2013.01); *G06F 3/04842* (2013.01); *G06T 11/60* (2013.01); *H04M 1/72544* (2013.01)

(58) Field of Classification Search
CPC .................................................. G06F 3/04817
See application file for complete search history.

(56) References Cited

U.S. PATENT DOCUMENTS 6,008,809 A    12/1999  Brooks
6,026,409 A     2/2000  Blumenthal
(Continued)

FOREIGN PATENT DOCUMENTS

KR    10-2004-0040743 A    5/2004
KR    10-2007-0024808 A    3/2007
(Continued)

*Primary Examiner* — Peiyong Weng
(74) *Attorney, Agent, or Firm* — Jefferson IP Law, LLP

(57) ABSTRACT

A method for displaying a background screen in a mobile terminal is provided. The method includes resizing at least one of a plurality of background screens according to a first input, displaying at least one of the at least one resized background screen, detecting a second input, and transitioning among the resized background screens based on the detected second input, wherein the background screens respectively include an icon.

21 Claims, 4 Drawing Sheets

(56) References Cited

U.S. PATENT DOCUMENTS

| | | |
|---|---|---|
| 7,429,993 B2 | 9/2008 | Hui |
| 7,587,683 B2 | 9/2009 | Ito et al. |
| 8,312,660 B1 | 11/2012 | Fujisaki |
| 8,355,698 B2 | 1/2013 | Teng et al. |
| 2003/0179240 A1* | 9/2003 | Gest ............... G06F 3/0481 715/779 |
| 2003/0189597 A1* | 10/2003 | Anderson ......... G06F 3/0481 715/778 |
| 2004/0266396 A1 | 12/2004 | Henry et al. |
| 2005/0037815 A1 | 2/2005 | Besharat et al. |
| 2007/0042800 A1 | 2/2007 | Tani |
| 2007/0050724 A1 | 3/2007 | Lee et al. |
| 2007/0174785 A1* | 7/2007 | Perttula ............ G06F 3/0481 715/800 |
| 2007/0176898 A1* | 8/2007 | Suh ................. G06F 1/1616 345/158 |
| 2008/0094398 A1* | 4/2008 | Ng .................. G06F 3/0486 345/427 |
| 2009/0075697 A1 | 3/2009 | Wilson et al. |
| 2009/0192900 A1 | 7/2009 | Collison et al. |
| 2009/0227294 A1 | 9/2009 | Ouchi et al. |
| 2010/0001968 A1* | 1/2010 | Lee .................. G06F 1/1626 345/173 |
| 2010/0062796 A1 | 3/2010 | Hayton et al. |
| 2011/0028186 A1 | 2/2011 | Lee et al. |
| 2011/0039534 A1 | 2/2011 | Lee et al. |
| 2012/0190386 A1 | 7/2012 | Anderson |

FOREIGN PATENT DOCUMENTS

| | | |
|---|---|---|
| KR | 10-2008-0077798 A | 8/2008 |
| KR | 10-2009-0006311 A | 1/2009 |

* cited by examiner

METHOD FOR DISPLAYING BACKGROUND SCREEN IN MOBILE TERMINAL

PRIORITY

This is a continuation application of U.S. patent application Ser. No. 12/900,715 filed on Oct. 8, 2010 in the U.S. Patent and Trademark Office, which claimed the benefit under 35 U.S.C. §119(a) of a Korean patent application filed in the Korean Intellectual Property Office on Oct. 13, 2009 and assigned Serial No. 10-2009-0097255, the entire disclosure of which is hereby incorporated by reference.

BACKGROUND OF THE INVENTION

1. Field of the Invention

The present invention relates to a mobile terminal. More particularly, the present invention relates to a method for displaying a background screen in a mobile terminal.

2. Description of the Related Art

In general, the term "mobile terminal" refers to a communication device with which a user can communicate and exchange data with another user while mobile. As mobile communication environments for such a mobile terminal are developing more and more, the capabilities of the mobile terminal, which has only previously been used for voice communication, are increasing. For example, with such a mobile terminal, the user may use Audio On Demand (AOD) and Video On Demand (VOD) services, may have mobile visual communication with another user in real time through the use of a camera installed in the mobile terminal, may download and play a game application, or may view a Digital Multimedia Broadcast (DMB) through the use of a DMB receiver. That is, mobile terminals have evolved into a device that enables the user to use various types of information in addition to the voice communication function.

The increase in capabilities of the mobile terminal leads to an increase in the kinds of applications to select and execute, which in turn means an increase in the kinds of icons, corresponding to applications, which are used to access the applications. However, since the mobile terminal is limited in size, it is not easy to display all icons on a display which likewise has a limited size.

In order to address such a problem, there has been proposed a method of setting a plurality of background screens displayed on a display unit, disposing a plurality of icons according to the set background screens, and enabling the user to make transitions between the background screens and to use the background screens as needed, so that a large number of icons can all be displayed on one display unit.

FIGS. 1A-1C are views illustrating background screens based on a method for displaying a background screen according to the related art.

Referring to FIGS. 1A-1C, the user may set a first background screen including icons 1a, 1b, and 1c, as shown in FIG. 1A, a second background screen including icons 2a, 2b, and 2c, as shown in FIG. 1B, and a third background screen including icons 3a, 3b, and 3c, as shown in FIG. 1C. Thereafter, when the user is to execute a specific application, the user identifies the location of an icon corresponding to the specific application while making transitions between the background screens shown in FIGS. 1A-1C in order to find the specific application, and executes the specific application by executing the icon when the user has identified the location of the icon. For example, when an icon corresponding an application the user desires to execute is icon 2a shown in a background screen shown in FIG. 1B, the user identifies that icon 2a has been registered in the background screen shown in FIG. 1B while making transitions between the three background screens shown in FIGS. 1A-1C, makes a transition to the background screen shown in FIG. 1B, and executes the icon 2a, thereby executing the desired application.

According to the method of the related art that is described with reference to FIGS. 1A-1C, icons are set according to background screens, so that all icons can be registered (or disposed) among the various background screens despite there being many icons. However, when the number of executable applications in a mobile terminal increases, the number of icons increases accordingly, thereby causing inconvenience to the user. That is, when there is a large number of icons, it is difficult for the user to remember which background screen an icon corresponding to a desired application is included in. Accordingly, the user must search for the corresponding icon while continuously making transitions between background screens, which causes inconvenience to the user.

Accordingly, there is a need to develop a method for enabling the user to easily identify icons registered according to background screens so that the user can rapidly execute a desired application.

SUMMARY OF THE INVENTION

An aspect of the present invention is to address at least the above-mentioned problems and/or disadvantages and to provide at least the advantages described below. Accordingly, an aspect of the present invention is to provide a method for enabling a user to easily identify icons registered according to background screens so that the user can rapidly execute a desired application.

In accordance with an aspect of the present invention, a method for displaying a background screen in a mobile terminal is provided. The method includes resizing other background screens, except for a current background screen currently being displayed, among a plurality of background screens to a predefined display size when a predefined key is input, and displaying the resized background screens in predefined regions, respectively, within a display area in which the current background screen is displayed.

In accordance with another aspect of the present invention, a mobile terminal apparatus for displaying a background screen is provided. The apparatus includes a display unit for displaying a background screen to a user, an input unit for receiving input from the user, and a controller for controlling to resize other background screens, except for a current background screen currently being displayed, among a plurality of background screens to a predefined display size when a predefined key is input, and for controlling to display the resized background screens in predefined regions, respectively, within a display area of the display in which the current background screen is displayed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The configuration of a mobile terminal according to an exemplary embodiment of the present invention will now be described with reference to FIG. 2.

Figures 1A, 1B, 1C:
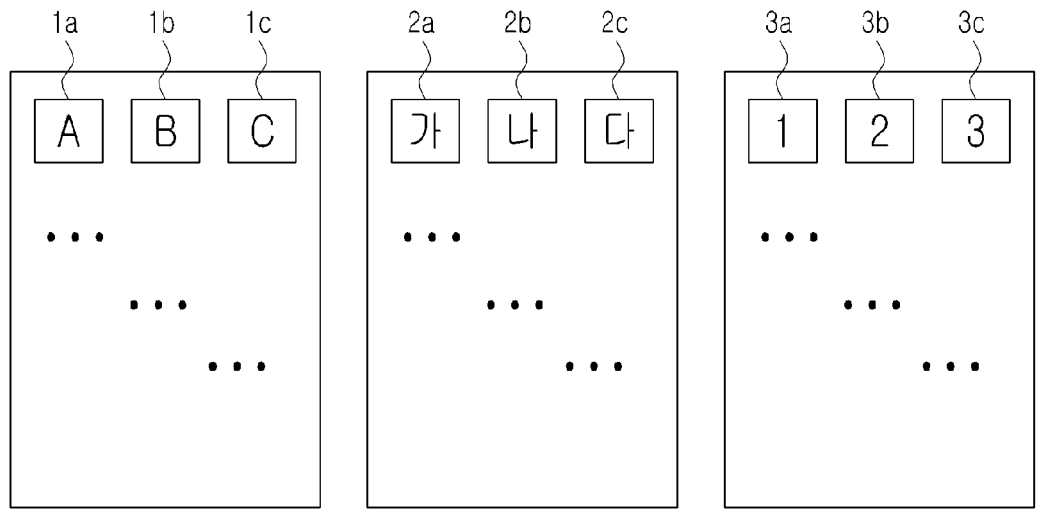
FIGS. 1A-1C are views illustrating background screens based on a method for displaying a background screen according to the related art.
Figure 2:
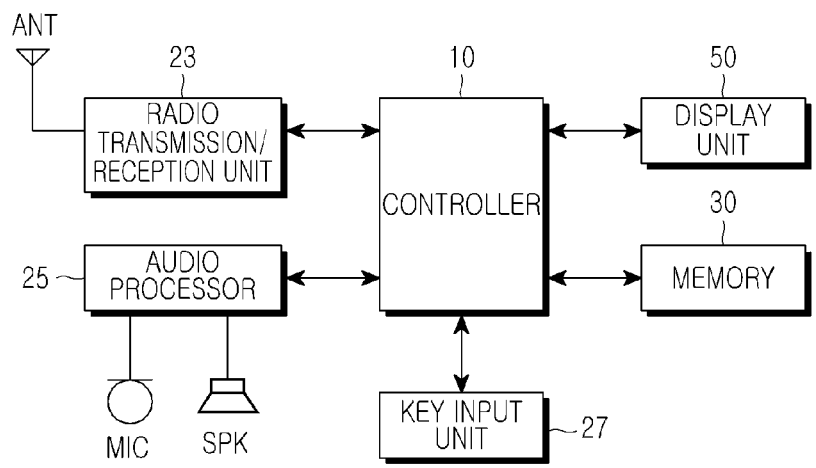
FIG. 2 is a block diagram illustrating the configuration of a mobile terminal according to an exemplary embodiment of the present invention.

FIG. 2 is a block diagram illustrating the configuration of a mobile terminal according to an exemplary embodiment of the present invention.

Referring to FIG. 2, a key input unit 27 includes keys for inputting numeric and text information, and function keys for setting various functions.

A radio transmission/reception unit 23 performs a wireless communication function of the mobile terminal, and includes a Radio Frequency (RF) module and a modem. The RF module includes an RF transmitter for up-converting a frequency of a transmission signal and amplifying the up-converted signal, and an RF receiver for low-noise amplifying a received signal and down-converting a frequency of the low-noise amplified signal. The modem includes a transmission section for encoding and modulating signals to be transmitted, and a reception section for demodulating and decoding signals received by the RF module.

An audio processor 25 may include a codec, which may contain a data codec and an audio codec. The data codec processes packet data or the like, and the audio codec processes audio signals, including voice, a multimedia file, etc. In addition, the audio processor 25 converts a digital audio signal received from the modem into an analog signal by means of the audio codec, and reproduces the analog signal. Also, the audio processor 25 converts an analog audio signal generated from a microphone (MIC) into a digital audio signal by means of the audio codec, and transfers the digital audio signal to the modem. In this case, the codec may be provided separately, or may be included in a controller 10 of the mobile terminal.

The memory 30 includes a Read Only Memory (ROM) and a Random Access Memory (RAM). The memory 30 may be configured by a program memory and a data memory, and may store data for booting and programs for controlling the operation of the mobile terminal.

A display unit 50 displays a video signal and/or user data on a screen, or displays communication-related data. In this case, the display unit 50 may be constructed with a Liquid Crystal Display (LCD), an Organic Light-Emitting Diode (OLED), and/or an Active Matrix Organic Light-Emitting Diode (AMOLED). When the LCD, OLED, and/or AMOLED is implemented in a touch screen type, the display unit 50 may serve as an input unit for controlling the mobile terminal together with the key input unit 27. Therefore, according to an exemplary embodiment of the present invention, the display unit 50 may include a touch screen, and serve as an input unit for controlling the mobile terminal together with the key input unit 27.

The controller 10 functions to control general operations of the mobile terminal. According to an exemplary embodiment of the present invention, when there is a plurality of set background screens, the controller 10 performs a control operation in such a manner as to resize background screens, other than the current background screen which is displayed in the display unit 50 according to a predefined key input, to have a predefined display size, and to display the resized background screens in predefined regions of the current background screen, respectively.

Figure 3:
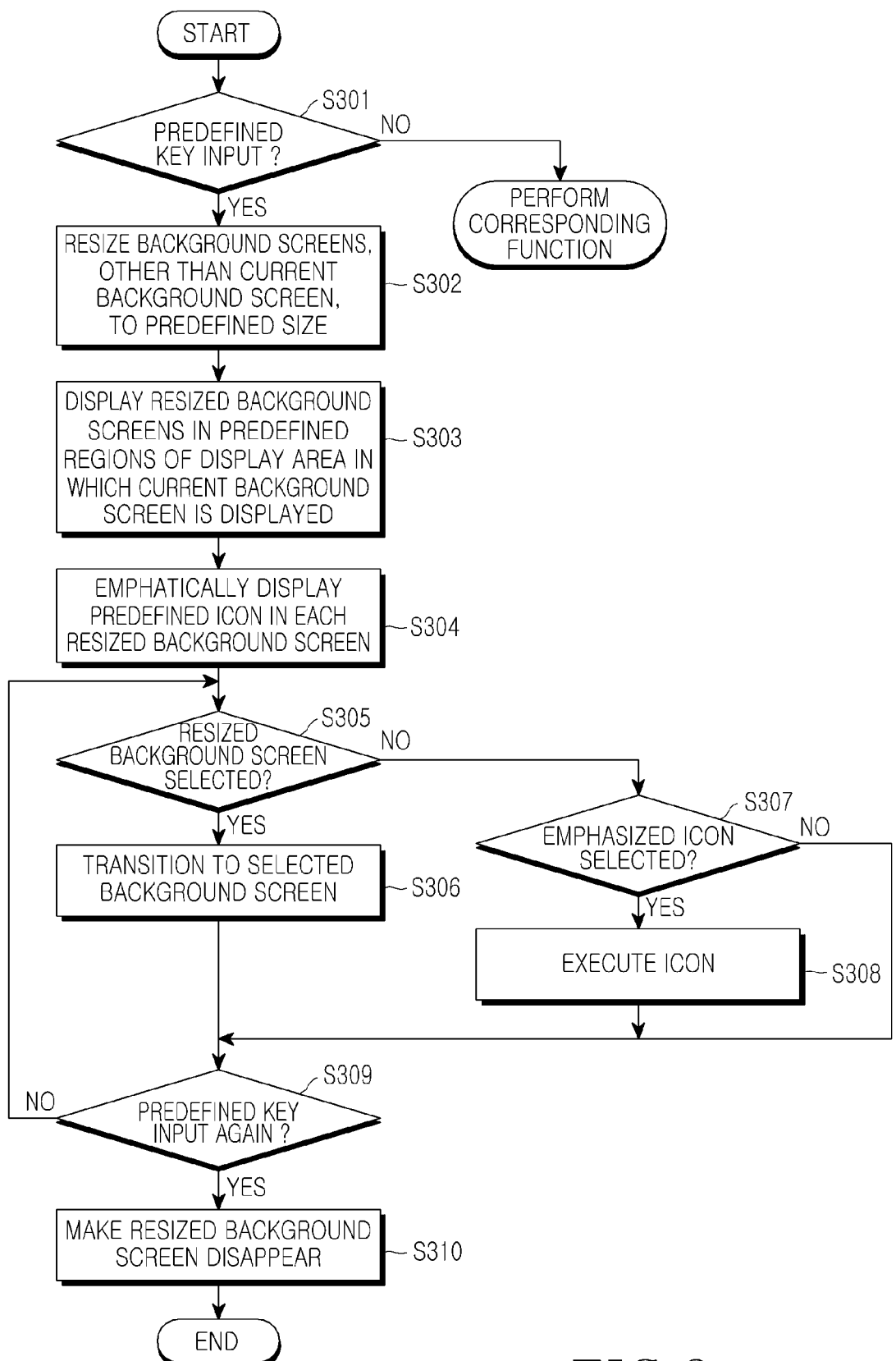
FIG. 3 is a flowchart illustrating a method for displaying a background screen according to an exemplary embodiment of the present invention.

FIG. 3 is a flowchart illustrating the method for displaying a background screen according to an exemplary embodiment of the present invention, and FIGS. 4A-4C and 5A-5C are views showing examples of background screens based on the method for displaying a background screen according to an exemplary embodiment of the present invention. Exemplary embodiments of the present invention will now be described with reference to FIGS. 2 to 5C.

In step S301 the controller 10 determines if a predefined key is input by a user. If the controller 10 determines that the predefined key is not input by a user, a corresponding function is performed. However, if the controller 10 determines that the predefined key is input by the user, the controller 10 performs a control operation to resize background screens, other than the current background screen, to a predefined display size in step S302, and to display the resized background screens at predefined locations in the current background screen in step S303.

In step S301, the predefined key refers to a key which is preset to resize background screens, other than a background screen currently being used by the user, to the predefined display size when a plurality of background screens have been registered in the mobile terminal. For example, when a specified key of the key input unit 27 is input (e.g., when a short or long key signal is input), or when a touch signal is input to the display unit 50 through a touch screen (e.g., when a specified location is touched or is touched for a long period of time), it may be determined that the predefined key is input. Meanwhile, a background screen 410 shown in FIG. 4A includes a plurality of icons 411, 412, and 413 for executing specific applications, a background screen 420 shown in FIG. 4B includes a plurality of icons 421, 422, and 423, and a background screen 430 shown in FIG. 4C includes a plurality of icons 431, 432, and 433, which are shown as an example.

Figures 4A, 4B, 4C:
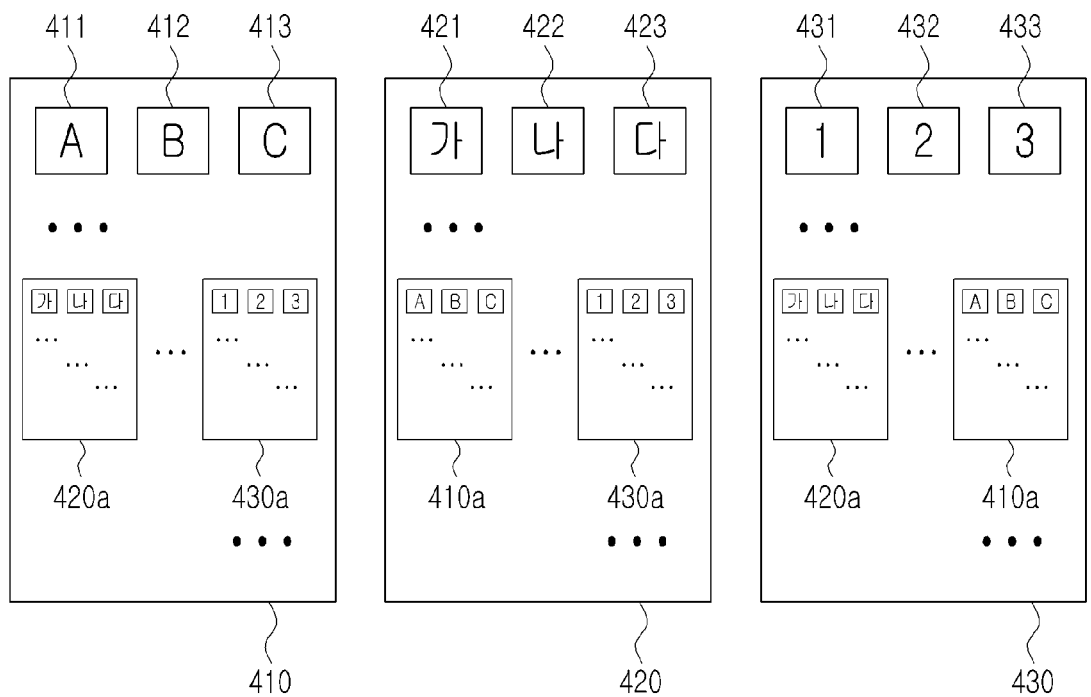
FIGS. 4A-4C are views showing a first example of background screens based on a method for displaying a background screen according to an exemplary embodiment of the present invention.

Therefore, when the three background screens 410, 420, and 430 shown in FIGS. 4A-4C have been registered in the mobile terminal, and a predefined key input is detected in a state where the background screen 410 is currently being used by the user, the controller 10 performs a control operation to resize the background screens 420 and 430 to a predefined size, as indicated by reference numbers 420a and 430a, respectively, and to display the resized background screens at predefined locations (or in predefined regions) of a display area in which the current background screen is displayed, as shown in the background screen 410 shown in FIG. 4A. Also, when a predefined key input is detected in a state where the background screen 420 is currently being used by the user, the controller 10 performs a control operation to resize the background screens 410 and 430 to a predefined size, as indicated by reference numbers 410a and 430a, respectively, and to display the resized background screens at predefined locations of a display area in which the current background screen is displayed, as shown in the background screen 420 shown in FIG. 4B. In addition, when a predefined key input is sensed in a state where the background screen 430 is currently being used by the user, the controller 10 performs a control operation to resize the background screens 420 and 410 to a predefined size, as indicated by reference numbers 420a and 410a, respectively, and to display the resized background screens at predefined locations of a display area in which the current background screen is displayed, as shown in the background screen 430 shown in FIG. 4C.

According to another exemplary embodiment of the present invention, the controller 10 may perform a control operation to resize and display icons also included in a resized and displayed background screen, to a predefined size corresponding to or not corresponding to the resized size of the background screen. When the resized background screens 410a, 420a, and 430a and icons included in each corresponding background screen are resized and displayed together, as shown in the background screens shown in FIGS. 4A-4C, the user may easily visually identify which icons have been registered or disposed in each background screen.

Also, according to another exemplary embodiment of the present invention, the controller 10 may perform a control operation such that the resized and displayed background screens have a characteristic (e.g., transparency, background color, a background image, etc.) for distinguishing the resized and displayed background screens from the current background screen. For example, in order to distinguish a resized and displayed background screen from the current background screen, the controller 10 may control the transparency of the resized and displayed background screen (e.g., to a transparency selected from a range of 0% to 100%), may change the background color of the resized and displayed background screen to a color different from the color of the current background screen, or may change the background image of the resized and displayed background screen to an image (e.g., wallpaper) different from the image of the current background screen.

After steps S301 to S303, the controller 10 emphatically displays a predefined icon in each resized and displayed background screen in step S304.

According to an exemplary embodiment of the present invention, the controller 10 may record an icon execution history performed by the user in a database, for example, in such a manner as to count the number of times of execution of each icon and/or an execution time of each icon, through which the controller 10 can identify the number of times of execution (or selection), and/or an execution (or selection) time according to each icon. Accordingly, according to an exemplary embodiment of the present invention, the controller 10 may emphatically display an icon executed by the largest number of times or a most recently executed icon among icons registered in each background screen so as to distinguish the corresponding icon from other icons. In this case, emphatically (or distinctively) displaying an icon according to an exemplary embodiment of the present invention denotes displaying the corresponding icon in a larger size than other icons or in a reversed form thereof. Through such a visual effect, the user can easily identify one or more icons which have been the most recently or frequently executed.

On the assumption that the most frequently or most recently used icon in each background screen corresponds to the icon 411 in the background screen 410, the icon 421 in the background screen 420, and the icon 431 in the background screen 430, an example of the operation performed in step S304 will now be described with reference to FIGS. 5A-5C.

Figure 5A:
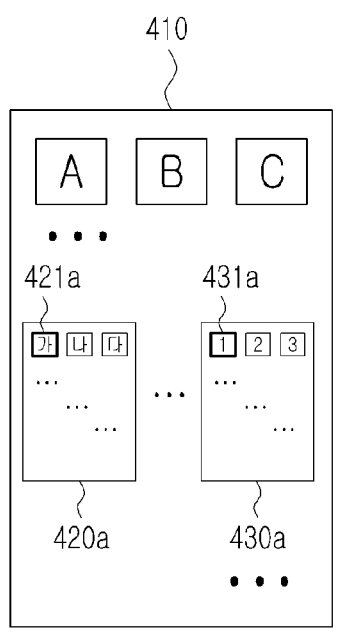
FIGS. 5A-5C are views showing a second example of background screens based on a method for displaying a background screen according to an exemplary embodiment of the present invention.
Figure 5B:
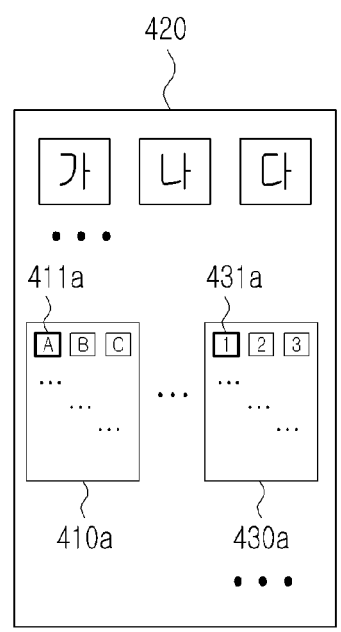

The background screen shown in FIG. 5A shows a modified example of the exemplary embodiment of the present invention described with reference to the background screen shown in FIG. 4A. In more detail, the background screen shown in FIG. 5A shows an example where the background screens 420 and 430 are resized to the background screens 420a and 430a and displayed, and icons 421 and 431 (see FIGS. 4B-4C), which are the most frequently or most recently used in the corresponding background screens 420 and 430, are resized/emphasized and displayed as icons 421a and 431a. The background screens shown in FIGS. 5B and 5C may be described in a similar manner to that described on the background screen as shown in FIG. 5A. Accordingly, icons 411a and 431a are resized/emphasized and displayed as part of background screens 410a and 430a, respectively, in background screen 420 shown in FIG. 5B. And icons 421a and 411a are resized/emphasized and displayed as part of background screens 420a and 410a, respectively, in background screen 430 shown in FIG. 5C.

Although the above description with reference to FIG. 5A and step S304 has been given on the case where only one icon is emphatically displayed according to each background screen, a plurality of icons may be emphatically displayed according to each resized and displayed background screen, which can be set by the user. For example, the controller 10 may emphatically display icons executed equal to or more than a predefined number of times according to each resized and displayed background screen. In this case, when icons are emphatically displayed, the user may set to preferentially emphasize and display the most recently executed icon, to preferentially emphasize and display the most recently executed icon, or to preferentially emphasize and display the most recently executed icon and the most recently executed icon at the same time. Also, the user may preset an icon to be emphatically displayed in a predefined background screen when the predefined background screen is resized and displayed.

After steps S301 to S304, the controller 10 determines if one of the resized background screens is selected in step S305, and makes a transition to a selected background screen in step S306 when it is determined that one of the resized background screens is selected.

When background screens and icons are resized and displayed, the user can identify a background screen in which an icon corresponding to an application desired to be executed by the user through the resized and displayed background screens and icons, and can make a transition to the corresponding background screen in order to execute the desired application. For example, in a state where the current background screen 420 and resized background screens 410a and 430a are displayed as shown in FIG. 4B, when an icon corresponding to an application desired to be executed by the user is located in the resized background screen 410a, the user may select the resized background screen 410a to make a transition to the background screen 410. When a transition has been made to the background screen 410, a list of icons 411, 412, and 413 registered in the background screen 410 is displayed in the background screen 410, and the user may execute one of the icons registered in the background screen 410 displayed by the transition so as to request a corresponding application to be executed. In this case, the selection of a resized background screen can be achieved by a key input (e.g., a directional key input) through the key input unit 27, or by a touch screen input such as either touching the resized background screen or dragging into the resized background screen. Also, according to an exemplary embodiment of the present invention, when the mobile terminal includes a device, such as an earth magnetic field sensor, sensing the motion of the mobile terminal, the user can request a transition to a resized and displayed background screen by moving the mobile terminal to a location of the resized and displayed background screen. For example, in a state where the background screen 410 shown in FIG. 4A is displayed, the user may move the mobile terminal to the left to make a transition to the background screen 420, or may move the mobile terminal to the right to transition to the background screen 430.

Separately from steps S305 and S306, when an icon emphasized by the user is selected in step S307, the controller 10 performs a control operation to execute an application corresponding to the selected icon in step S308.

An application desired by the user may be executed by making a transition to a background screen, as described in steps S305 and S306, and then executing an icon corresponding to the desired application, or an additional adjustment of the mobile station by the user may be required for executing the desired application. Therefore, according to an exemplary embodiment of the present invention, there is proposed a method for immediately executing an application corresponding to only an emphatically displayed icon when the emphasized icon is selected.

Figure 5C:
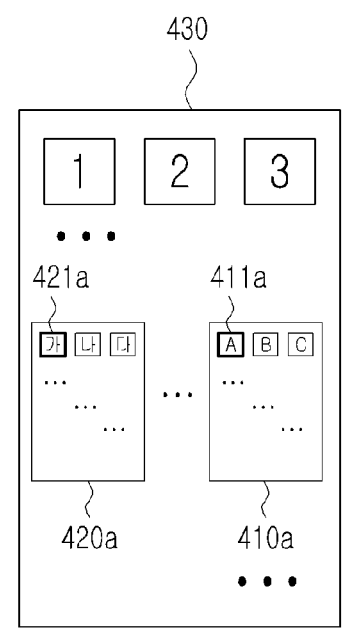

For example, as shown in the background screen shown in FIG. 5C, when an icon 421 corresponding to an application desired to be executed by the user is emphatically displayed as an icon 421a, the user can request an immediate execution of the application corresponding to the icon 421 by selecting or executing the icon 421a. In this case, the selection of the emphatically displayed icon 411a, 421a, or 431a may be achieved by a direction key input, by a touch screen input, or by a motion of the mobile terminal, as well.

After step S306 and step S308, the controller 10 determines if a predefined key signal, as input in step S301, is again input in step S309, and performs a control operation to make the resized and displayed background screen disappear in step S310 when the predefined key signal is again input.

When the predefined key signal is again input, the controller 10 performs a control operation to make the resized and displayed background screens (e.g., background screens 410a, 420a, and 430a) disappear from a background screen as shown in FIGS. 4A-4C and 5A-5C so that only the current background screen (or a background screen resulting from a transition) can be displayed in the display unit 50. Through this, the user can more easily identify icons registered in the background screens.

Although the technical aspects of the present invention have been described in detail with the exemplary embodiments of the present invention, it should be appreciated that the exemplary embodiments described above are not limiting, but are instead only illustrative.

According to exemplary embodiments of the present invention, the user can easily identify icons registered according to each background screen, so that the user can rapidly execute a desired application.

In addition, according to the exemplary embodiments of the present invention, one or more frequently or recently executed icons among icons registered in each background screen are emphatically displayed, so that the user can rapidly and easily execute frequently or recently executed applications.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for displaying a screen in a mobile communication terminal, the method comprising:
   displaying, via a display including a touch screen operatively coupled with the mobile communication terminal, at least one background screen on the mobile communication terminal;
   resizing, via the display, at least two of a plurality of screens according to a first touch input;
   displaying, via the display, at least one of the at least two resized screens over at least a portion of the displayed at least one background screen;

changing a transparency of the at least one of the at least two resized screens; detecting, via the display, a second touch input; and scrolling, via the display, among the at least two resized screens based on the detected second touch input, wherein the plurality of screens respectively include at least one icon, and wherein, when the at least two of the plurality of screens are resized, at least a portion of the at least one icon included in each of the at least two screens is resized and displayed within the corresponding resized screen.

2. The method of claim 1, wherein the detecting of the second touch input comprises:

detecting an orientation of the mobile communication terminal.

3. The method of claim 1, wherein at least one of the at least two screens comprises an icon among the resized and displayed at least one icon that is emphatically displayed.

4. The method of claim 3, wherein the emphatically displayed icon corresponds to at least one of:

an icon selected or executed equal to or more than a predefined number of times;

an icon which has been most recently selected or executed at a time point when the first touch input occurs; and an icon preset to be emphatically displayed in a background screen which includes the emphatically displayed icon.

5. The method of claim 1, further comprising: when one of the at least two screens is selected, transitioning to a background screen corresponding to the selected screen.

6. The method of claim 5, wherein the transitioning to the background screen comprises:

setting the background screen corresponding to the selected screen as a current background screen; and displaying the current background screen.

7. The method of claim 1, further comprising: when a third touch input is input while the at least two screens are displayed, stopping the displaying of the at least two screens.

8. The method of claim 1, wherein the at least two screens are displayed with a background element to distinguish the at least two screens from the at least one background screen.

9. The method of claim 2, wherein the detecting of the orientation of the mobile communication terminal comprises:

detecting a motion of the mobile communication terminal.

10. The method of claim 9, wherein the detecting of the motion of the mobile communication terminal comprises:

detecting a tilting of the mobile communication terminal.

11. A non-transitory computer-readable storage medium storing instructions that, when executed, cause at least one processor to perform a method comprising:

displaying, via a display including a touch screen operatively coupled with the at least one processor, at least one background screen on a mobile communication terminal;

resizing, via the display, at least two of a plurality of screens according to a first touch input;

displaying, via the display, at least one of the at least two resized screens over at least a portion of the displayed at least one background screen;

changing a transparency of the at least one of the at least two resized screens; detecting, via the display, a second touch input; and scrolling, via the display, among the at least two resized screens based on the detected second touch input, wherein the plurality of screens respectively include at least one icon, and wherein, when the plurality of screens are resized, at least a portion of the at least one icon included in each of the at least two screens is resized and displayed within the corresponding resized screen.

12. A mobile communication terminal for displaying a background screen, the mobile communication terminal comprising:

a display including a touch screen operatively coupled with the mobile communication terminal and configured to display at least one background screen to a user;

an input device configured to receive a touch input from the user;

and at least one processor configured to:

resize, via the display, at least two of a plurality of screens when a first touch input is input, display, via the display, at least one of the at least two resized screens over at least a portion of the displayed at least one background screen, change a transparency of the at least one of the at least two resized screens, detect, via the display, a second touch input, and scroll, via the display, among the at least two resized screens based on the second touch input, wherein the plurality of screens respectively include at least one icon, and wherein, when the at least two of the plurality of screens are resized, at least a portion of the at least one icon included in each of the at least two screens is resized and displayed within the corresponding resized screen.

13. The mobile communication terminal of claim 12, wherein the second touch input corresponds to an orientation detected by using a sensor.

14. The mobile communication terminal of claim 12, wherein at least one of the at least two screens comprises an icon among the resized and displayed at least one icon that is emphatically displayed.

15. The mobile communication terminal of claim 14, wherein the emphatically displayed icon corresponds to at least one of:

an icon selected or executed equal to or more than a predefined number of times;

an icon which has been most recently selected or executed at a time point when the first touch input occurs; and an icon preset to be emphatically displayed in a background screen which includes the emphatically displayed icon.

16. The mobile communication terminal of claim 13, wherein, when one of the at least two screens is selected, the at least one processor transitions to a background screen corresponding to the selected screen.

17. The mobile communication terminal of claim 16, wherein, when the at least one processor transitions to the selected screen, the at least one processor sets the background screen corresponding to the selected screen as a current background screen, and controls the display to display the current background screen.

18. The mobile communication terminal of claim 13, wherein, when a third touch input is input when the at least two screens are displayed, the at least one processor controls to stop display of the at least two screens.

19. The mobile communication terminal of claim 13, wherein the at least two screens are displayed with a background element to distinguish the at least two screens from a current background screen.

20. The method of claim 1, wherein the displaying of the at least one of the at least two screens comprises:
  displaying a first screen and at least a portion of at least one second screen, as at least partially overlapped with the at least one background screen.

21. The mobile communication terminal of claim 12, wherein the processor displays a first screen and at least a portion of at least one second screen, as at least partially overlapped with the at least one background screen.

* * * * *